(12) United States Patent
Choi et al.

(10) Patent No.: US 12,525,687 B2
(45) Date of Patent: Jan. 13, 2026

(54) BATTERY MODULE AND BATTERY PACK INCLUDING THE SAME

(71) Applicant: LG ENERGY SOLUTION, LTD., Seoul (KR)

(72) Inventors: Jonghwa Choi, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 702 days.

(21) Appl. No.: 17/790,424

(22) PCT Filed: Jan. 26, 2021

(86) PCT No.: PCT/KR2021/000996
§ 371 (c)(1),
(2) Date: Jun. 30, 2022

(87) PCT Pub. No.: WO2021/215625
PCT Pub. Date: Oct. 28, 2021

(65) Prior Publication Data
US 2023/0037763 A1 Feb. 9, 2023

(30) Foreign Application Priority Data

Apr. 24, 2020 (KR) .................. 10-2020-0049877

(51) Int. Cl.
*H01M 50/505* (2021.01)
*H01M 10/613* (2014.01)
(Continued)

(52) U.S. Cl.
CPC ....... *H01M 50/505* (2021.01); *H01M 10/613* (2015.04); *H01M 10/647* (2015.04); *H01M 50/211* (2021.01)

(58) Field of Classification Search
CPC .. H01M 50/505; H01M 50/507; H01M 50/20; H01M 10/04; H01M 6/5038;
(Continued)

(56) References Cited

U.S. PATENT DOCUMENTS

2017/0025719 A1 1/2017 Yamada et al.
2017/0301969 A1* 10/2017 Dudley ............... H01M 50/291
(Continued)

FOREIGN PATENT DOCUMENTS

CN 104576991 A 4/2015
CN 107851759 A 3/2018
(Continued)

OTHER PUBLICATIONS

International Search Report for PCT/KR2021/000996 mailed on Apr. 29, 2021.

*Primary Examiner* — Jeffrey T Barton
*Assistant Examiner* — Gigi Lee Lin
(74) *Attorney, Agent, or Firm* — Birch, Stewart, Kolasch & Birch, LLP

(57) ABSTRACT

A battery module includes: a battery cell stacked member in which a plurality of battery cells are stacked; a bus bar frame respectively connected to the front and rear surfaces of the battery cell stacked member; and a frame member accommodating the battery cell stacked member to which the bus bar frame is mounted, wherein one side of the bottom part of the frame member includes at least two step regions, at least two step regions are spaced apart in the same direction as the direction in which the battery cells are stacked, and the bus bar frame includes a support positioned to correspond to the step region.

14 Claims, 14 Drawing Sheets

(51) Int. Cl.
*H01M 10/647* (2014.01)
*H01M 50/211* (2021.01)

(58) Field of Classification Search
CPC ............. H01M 10/613; H01M 10/647; H01M 50/211; H01M 10/6556; H01M 10/653; H01M 50/50; H01M 50/502; Y02E 60/10
See application file for complete search history.

(56) References Cited

U.S. PATENT DOCUMENTS

| | | | |
|---|---|---|---|
| 2018/0175343 A1 | 6/2018 | Chol et al. | |
| 2019/0027714 A1 | 1/2019 | Jung et al. | |
| 2019/0074557 A1* | 3/2019 | Shin | H01M 10/6553 |
| 2019/0131596 A1 | 5/2019 | Yang et al. | |
| 2019/0198952 A1* | 6/2019 | Choi | H01M 10/655 |
| 2019/0221798 A1* | 7/2019 | Eisermann | H01M 50/271 |
| 2019/0237832 A1 | 8/2019 | Ju et al. | |
| 2019/0305261 A1 | 10/2019 | Kim et al. | |
| 2020/0006823 A1 | 1/2020 | Chung et al. | |
| 2020/0035980 A1 | 1/2020 | Hong et al. | |
| 2020/0388805 A1 | 12/2020 | Yoo et al. | |
| 2020/0395643 A1 | 12/2020 | Seo et al. | |
| 2021/0043981 A1 | 2/2021 | Fukuoka et al. | |
| 2021/0066676 A1 | 3/2021 | Jung et al. | |
| 2021/0288360 A1 | 9/2021 | Kim et al. | |
| 2021/0359357 A1 | 11/2021 | Chung et al. | |

FOREIGN PATENT DOCUMENTS

| | | | | |
|---|---|---|---|---|
| CN | 109891627 A | | 6/2019 | |
| CN | 209447871 U | | 9/2019 | |
| CN | 110770946 A | * | 2/2020 | ........ H01M 10/4207 |
| CN | 110915019 A | | 3/2020 | |
| JP | 6146533 B2 | | 6/2017 | |
| KR | 10-2014-0073636 A | | 6/2014 | |
| KR | 10-2018-0029856 A | | 3/2018 | |
| KR | 10-2019-0032609 A | | 3/2019 | |
| KR | 10-2019-0078521 A | | 7/2019 | |
| KR | 10-2019-0114645 A | | 10/2019 | |
| KR | 10-2019-0139620 A | | 12/2019 | |
| KR | 10-2020-0003600 A | | 1/2020 | |
| KR | 10-2020-0008624 A | | 1/2020 | |
| WO | WO-2014011801 A1 | * | 1/2014 | ........ H01M 10/0525 |
| WO | WO 2019/187043 A1 | | 10/2019 | |
| WO | WO 2020/055219 A1 | | 3/2020 | |

* cited by examiner

BATTERY MODULE AND BATTERY PACK INCLUDING THE SAME

BACKGROUND OF THE INVENTION

(a) Field of the Invention

Technical Field

This application claims priority to and the benefit of Korean Patent Application No. 10-2020-0049877 filed in the Korean Intellectual Property Office on Apr. 24, 2020, the entire contents of which are incorporated herein by reference.

The present invention relates to a battery module and a battery pack including the same, and more specifically, to a battery module with improved rigidity and a battery pack including the same.

Background Art

As technology development and a demand for mobile devices increase, the demand for secondary batteries as an energy source is rapidly increasing. Particularly, the secondary batteries are attracting a lot of interest as an energy source for power devices such as electric bicycles, electric vehicles, and hybrid electric vehicles as well as mobile devices such as mobile phones, digital cameras, laptops, and wearable devices.

Whereas one, two, or three battery cells per device are used for small mobile devices, medium and large devices such as automobiles require high power/large capacity. Therefore, a medium or large-sized battery module in which a plurality of battery cells are electrically connected to each other is used.

Since the medium and large-sized battery modules are preferably manufactured with a small a size and weight as possible, prismatic batteries and pouch-type batteries that may be stacked with a high degree of integration and have a small weight-to-capacity ratio are mainly used as a battery cell in the medium and large-sized battery modules. On the other hand, the battery module, in order to protect the battery cell stack from an external impact, heat, or vibration, may include a frame member of which front and rear surfaces are opened in the inner space for accommodating the battery cell stack. In addition, in the battery module, in order for a plurality of battery cells to be mounted inside the frame member, the rigidity of the frame member needs to be increased to withstand the weight of a plurality of battery cells.

DISCLOSURE

Technical Problem

The object to be solved of the present invention is to provide a battery module with improved rigidity of a frame member and a battery pack including the same.

The technical objects of the present invention to be solved are not limited to the above, and other non-mentioned objects will be clearly understood by a person of ordinary skill in the art by way of the following description.

Technical Solution Method

A battery module according to an embodiment of the present invention includes: a battery cell stacked member in which a plurality of battery cells are stacked in a first direction; a bus bar frame connected to at least one of a front surface and a rear surface of the battery cell stacked member; and a frame member accommodating the battery cell stacked member to which the bus bar frame is mounted, wherein a first side of a bottom part of the frame member includes a plurality of step regions, wherein the plurality of step regions are spaced apart in the first direction, and the bus bar frame includes a support positioned to correspond to the plurality of step regions.

A protruded part extending toward the plurality of step regions may be formed at an end of each of the plurality of battery cells, and the support of the bus bar frame may be positioned between the protruded part and the plurality of step regions.

The support may extend from the bus bar frame in a direction vertical to the first direction, the support may include the plurality of step parts corresponding to the plurality of step regions, and the plurality of step parts may be formed to be spaced apart along the first direction.

The support may include a first surface in contact with a side of the protruded part and a second surface in contact with a lower surface of the protruded part.

Each step region of the plurality of step regions may be concavely formed to correspond to the first surface and the second surface.

The support may include a plurality of step parts respectively mounted to the plurality of step regions and a supporting part disposed between the parts adjacent to each other, and the plurality of supporting parts and the plurality of step parts may be formed with a wave shape.

A thickness of each battery cell of the the plurality of battery cells may be larger than a thickness of the protruded part.

The plurality of step regions may include a first step region and a second step region, and a distance between the first step region and the second step region may correspond to a difference of the thickness of the battery cell and the thickness of the protruded part.

The bottom part of the frame member may include a first portion and a second portion, and the plurality of step regions may correspond to the first portion, and a thickness of the first portion may be less than a thickness of the second portion.

The frame member may include a lower frame covering a lower part and opposite sides of the battery cell stacked member and an upper plate covering an upper surface of the battery cell stacked member.

One step part extending in the first direction may be formed at a second side of the bottom part of the frame member.

A protruded part to which a cooling port is combined may be respectively formed at both ends of the second side of the bottom part of the frame member.

A battery pack according to an embodiment of the present invention includes the above-described battery module.

Advantageous Effects

According to an embodiment, by forming a plurality of step regions in the frame member region in which the supporting part of the bus bar frame is mounted, it is possible to secure insulation performance while protecting the protruded part of the battery cell and to reduce the thickness of the thermally conductive resin.

In addition, by forming a plurality of the step regions in a large area module and mounting a bus bar frame at a plurality of step region positions, rigidity of the frame member may be secured.

The effects of the present application are not limited to the above-described effects, and effects that are not mentioned will be clearly understood by those of ordinary skill in the technical field to which the present application belongs from the specification and the accompanying drawings.

MODE FOR INVENTION

Figure 1:
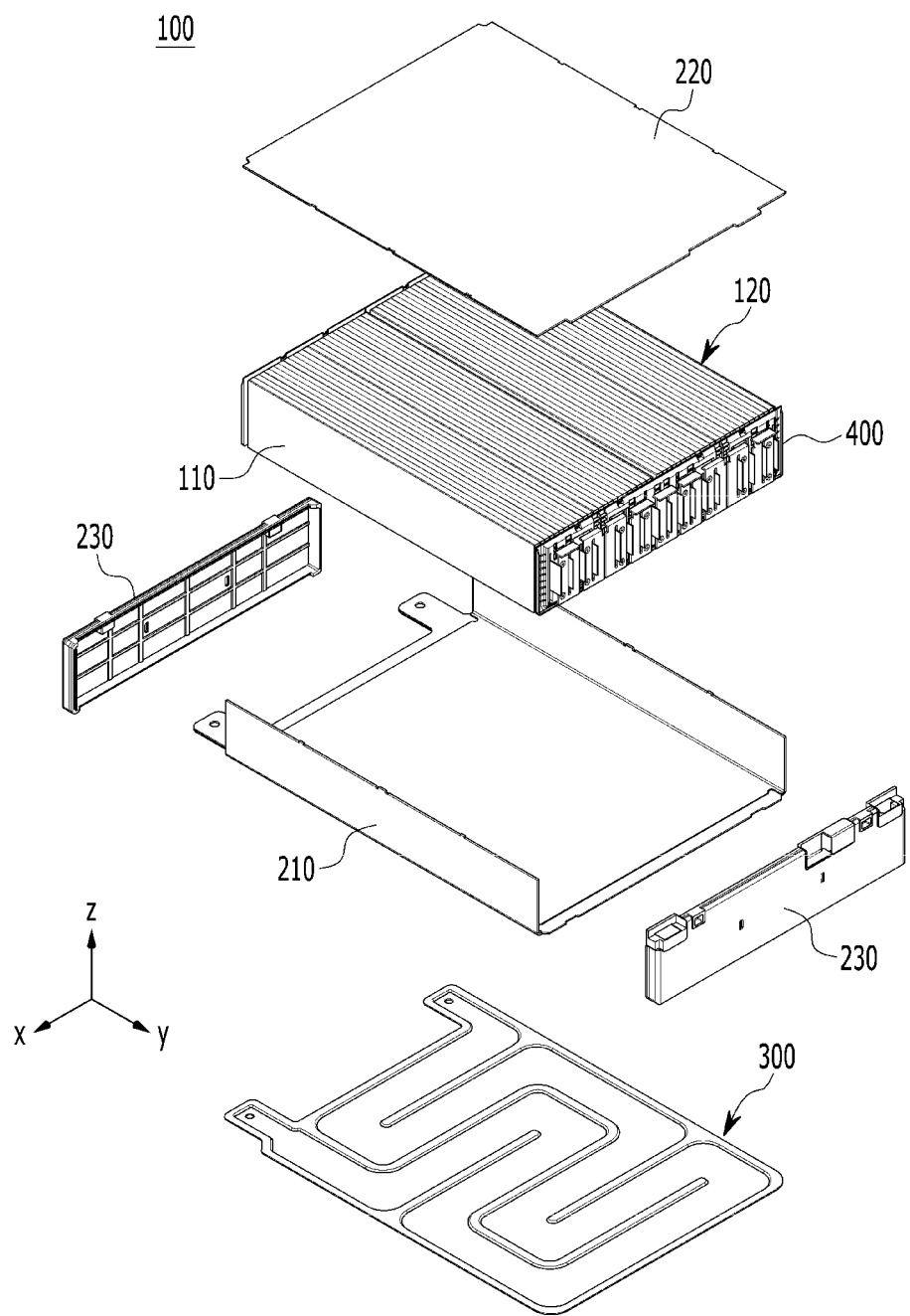
FIG. 1 is an exploded perspective view showing a battery module according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to elucidate the present invention, parts that are not related to the description will be omitted. Like reference numerals designate like elements throughout the specification.

In addition, the size and thickness of each component shown in the drawings are arbitrarily shown for ease of understanding and description, but the present invention is not limited thereto. In the drawings, the thickness of layers, films, panels, regions, etc., are exaggerated for clarity. In addition, in the drawings, for understanding and ease of description, the thicknesses of some layers and areas are exaggerated.

In addition, unless explicitly described to the contrary, the word "comprise", and variations such as "comprises" or "comprising", will be understood to imply the inclusion of stated elements but not the exclusion of any other elements.

Further, in the specification, the phrase "on a flat surface" means when an object portion is viewed from above, and the phrase "on a cross-section" means when a cross-section taken by vertically cutting an object portion is viewed from the side.

Hereinafter, an electrode for a secondary battery according to an embodiment of the present application will be described. However, the description will be made based on the front of the front and rear surfaces of the battery module, but the description is not limited thereto and may be described with the same or similar contents even in the case of the rear surface.

Figure 2:
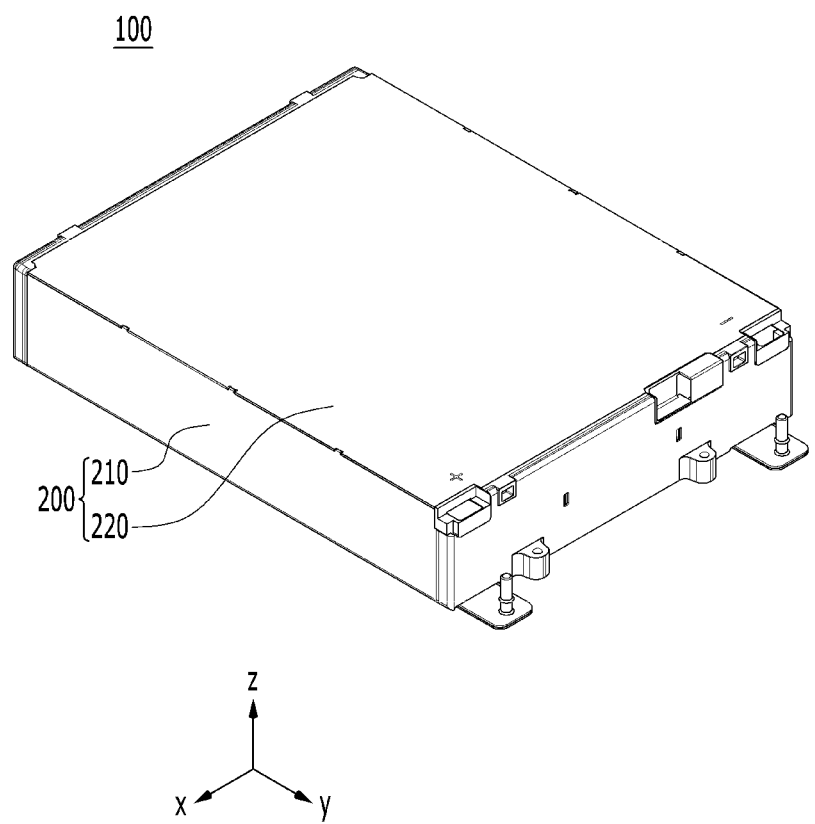
FIG. 2 is a perspective view showing a state in which constituent elements configuring a battery module of FIG. 1 are coupled.
Figure 3:
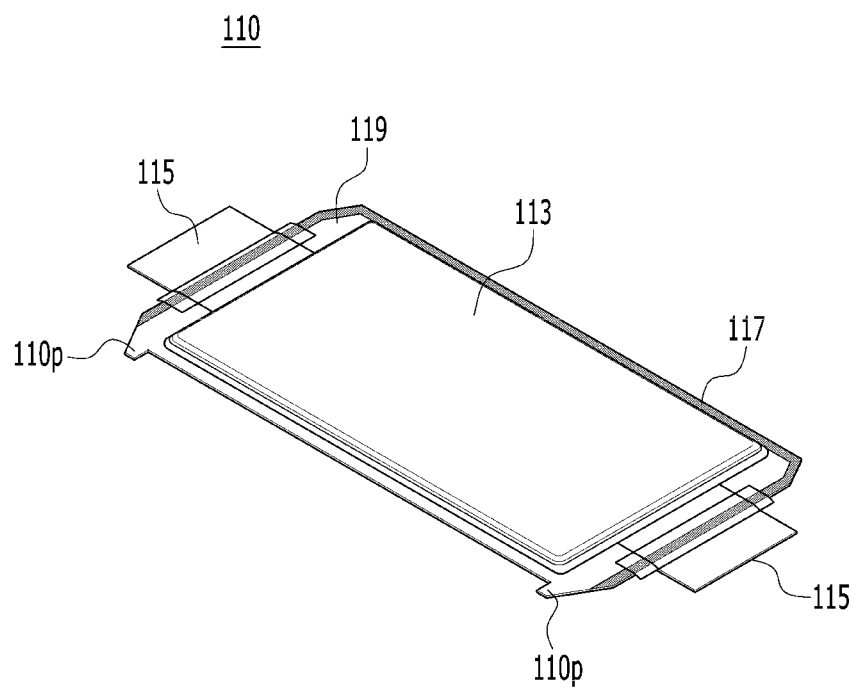
FIG. 3 is a perspective view showing a pouch-type battery according to an embodiment of the present invention.

FIG. 1 is an exploded perspective view showing a battery module according to an embodiment of the present invention. FIG. 2 is a perspective view showing a state in which constituent elements configuring a battery module of FIG. 1 are coupled. FIG. 3 is a perspective view showing a pouch-type battery according to an embodiment of the present invention.

Referring to FIG. 1 and FIG. 2, a battery module 100 according to the present embodiment may include a battery cell stacked member 120 in which a plurality of battery cells 110 are stacked in one direction, a frame member 200 accommodating the battery cell stacked member 120, an end plate 230 covering the front and rear surfaces of the battery cell stacked member, and a bus bar frame 400 formed between the end plate 230 and the front and rear surfaces of the battery cell stacked member 120. The frame member 200 may include a lower frame 210 covering the lower portion and both sides of the battery cell stacked member 120, and an upper plate 220 covering the upper surface of the battery cell stacked member 120. In addition, the battery module 100 according to the present embodiment may further include a heat sink 300 formed below the lower frame 210 to cool the battery cell stacked member 120.

However, the heat sink 300 formed on the lower surface of the lower frame 210 may be omitted if necessary. In addition, the shape of the lower frame 210 and the upper plate 220 is not limited thereto, and may be replaced with a frame of another shape such as a mono frame covering the remaining four surfaces except for the L-shaped frame or the front and rear surfaces of the battery cell stacked member 120.

Referring to FIG. 1 and FIG. 3, it is preferable that a plurality of battery cells 110 are stacked in one direction in the battery cell stacked member 120 and that the battery cell 110 is a pouch-type battery cell. The battery cell 110 according to an embodiment has a structure in which electrode leads 115 facing each other are respectively protruded on both ends of the battery body 113. Also, the battery cell 110 may be manufactured into a pouch-type as an electrode assembly (not shown) is accommodated to the battery case 117 including the battery body 113.

In addition, the battery cell 110 includes a connection part 119, which is an area extending along the edge and a protruded part 110p of the battery cell 110 called a bat-ear, may be formed at the end of the connection part 119. The protruded part 110p may be formed at at least one of both ends of the connection part 119, and may be protruded in a direction vertical to the direction in which the connection part 119 extends. The protruded part 110p is caught in the step region formed on one side of the lower frame, which is described later, thereby preventing the battery cell 110 from moving by an external impact. Specifically, the battery cell 110 is a pouch-type battery cell and the thickness of the battery body 113 may be larger than that of the protruded part 110p.

In relation to the protruded part 110p of the battery cell 110 according to the present embodiment, the rigidity of the frame member 200 may be increased through the structural features of the bus bar frame 400 and the frame member 200. Because, in the past, the weight of the battery cell stacked member 120 mounted on the lower frame 210 was not large, but recently it is necessary to install the battery cell stacked member including more battery cells than the existing battery module in one battery module to form the battery module 100 as a large area module. Here, in the case of a large area module, the horizontal direction length of the battery module becomes relatively long. The length in the horizontal direction of the battery module may mean the length in the direction in which the battery cells are stacked.

Accordingly, unlike the prior art, an issue of the weight of the battery cell stacked member 120 has arisen. This is because the center portion of the frame member 200 becomes weak in the large area module as more battery cells 110 are stacked in one battery module 100. Accordingly, the battery module 100 including the bus bar frame 300 and the frame member 200, in which the rigidity increases to be applied to the large-area battery module according to an embodiment of the present invention, is described in detail.

Figure 4:
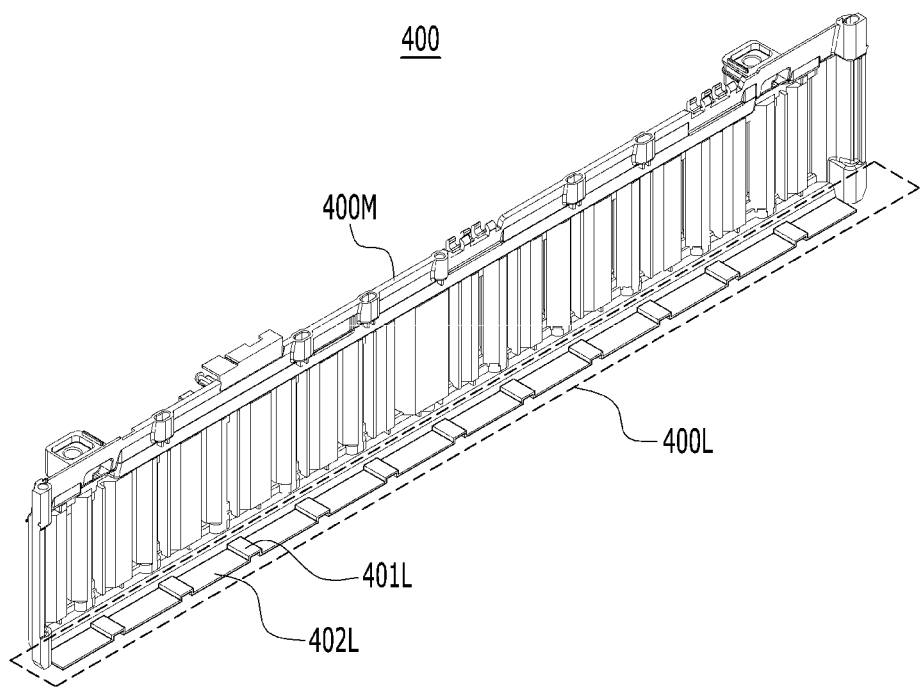
FIG. 4 is a perspective view showing a bus bar frame according to an embodiment of the present invention.
Figure 5:
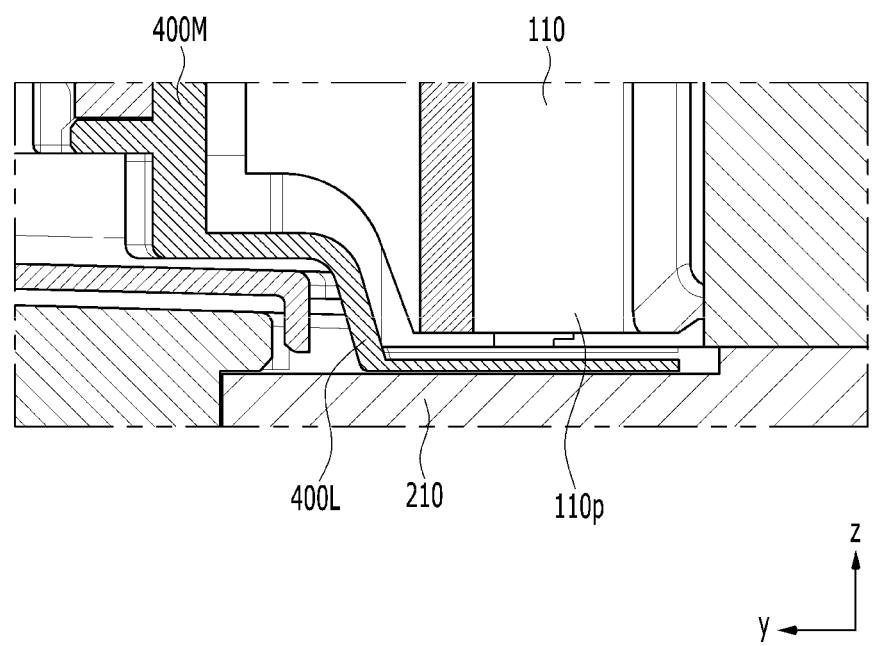
FIG. 5 is a view showing some of a cross-section taken along a yz plane of FIG. 2.

FIG. 4 is a perspective view showing a bus bar frame according to an embodiment of the present invention. FIG. 5 is a view showing some of a cross-sectional view taken along a yz plane of FIG. 2.

Referring to FIG. 4 and FIG. 5, the bus bar frame 400 according to the present embodiment includes a main frame 400M covering the front and rear surfaces of the battery cell stacked member 120 of FIG. 1, and a supporting unit 400L extending and protruded below the main frame 400M. The supporting unit 400L may have an L-shape extending from the bus bar frame 400 in a direction in which the battery cell stacked member 120 is positioned. In addition, the supporting unit 400L may be formed by extending in the length direction (the x-axis direction) of the bus bar frame 400 under the bus bar frame 400. The supporting unit 400L may be integrally formed with the bus bar frame 400 or may be manufactured separately and attached to the lower part of the bus bar frame 400.

As shown in FIG. 5, the supporting unit 400L may have a shape surrounding at least one region among the protruded part 110p formed in the battery cell 110. The supporting unit 400L may have a shape respectively surrounding at least one region of a plurality of protruded parts 110p positioned as a plurality of battery cells 110 are stacked. The supporting unit 400L according to the present embodiment is extended in the stacked direction of the battery cell stacked member 120, but may have a shape in which the step is formed partially according to the shape of the protruded part 110p of the battery cell 110.

Specifically, the supporting unit 400L according to the present embodiment, as shown in FIG. 4, may include a supporting part 401L and a step part 402L formed between the supporting parts 401L adjacent to each other. The supporting part 401L may be in contact with the side of the protruded part 110p, and the step part 402L may be in contact with the lower part of the protruded part 110p. The side of the protruded part 110p according to the present embodiment may be partially cut to have a concave shape when being viewed from a cross-section, and the L-shaped part of the supporting unit 400L may correspond to this concave shape.

The supporting part 401L and the step part 402L may be formed in a shape corresponding to the shape of the protruded part 110p. Particularly, the supporting part 401L may have a shape that corresponds to both sides of the protruded part 110p, and the step part 402L may have a shape that corresponds to the shape of the lower part of the protruded part 110p. In addition, the supporting part 401L and the step part 402L may be formed with a length corresponding to the shape of the protruded part 110p. Particularly, the supporting part 401L may be formed with a length corresponding to both sides of the protruded part 110p, and the step part 402L may be formed with a length corresponding to the shape of the lower part of the protruded part 110p. The supporting part 401L and the step part 402L may form a wave shape.

Accordingly, the supporting part 401L and the step part 402L of the supporting unit 400L may wrap both the side and the bottom of the protruded part 110p, thereby the empty space between the battery body 113 of the battery cell 110, in which the protruded part 110p is not formed, and the lower frame 210 corresponding to the bottom of the frame member 200, may be reduced. In addition, the protruded part 110p formed in the battery cell 110 may be effectively protected from the external impact. In addition, insulation performance for the protruded part 100p formed in the battery cell 110 may be effectively secured. In addition, as the supporting part 401L included in the supporting unit 400L supports the protruded part 110p formed in the battery cell 110, the rigidity of the module frame 200 can be more secured.

Figure 6:
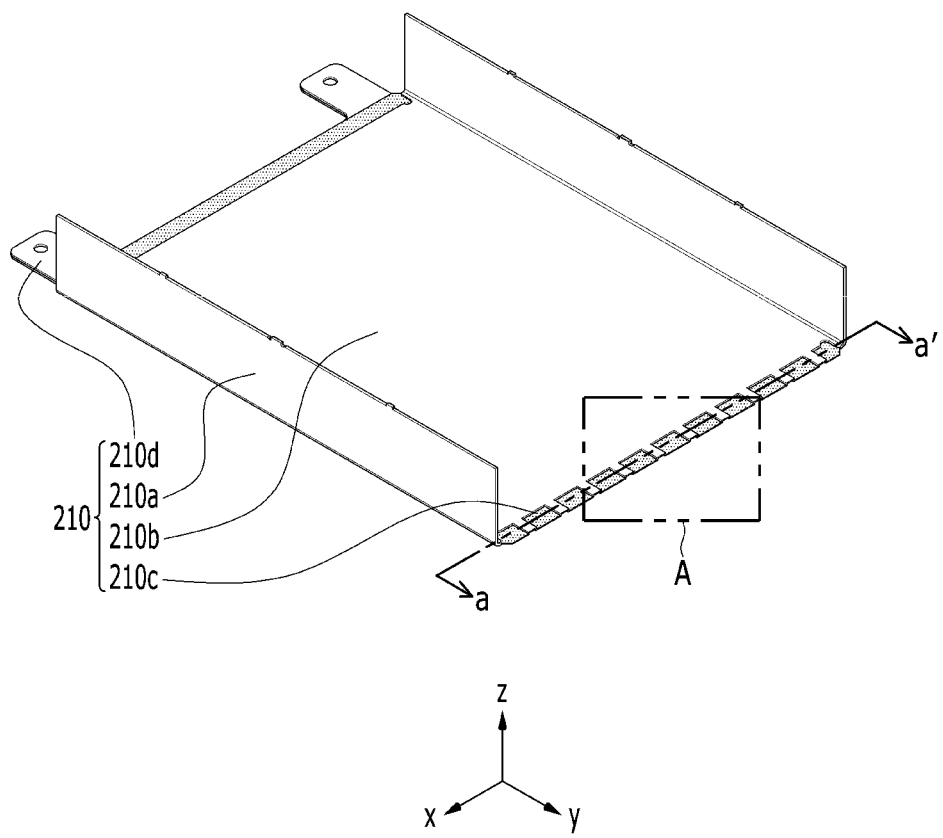
FIG. 6 is a perspective view showing a lower frame according to an embodiment of the present invention.

FIG. 6 is a perspective view showing a lower frame according to an embodiment of the present invention.

Figure 7:
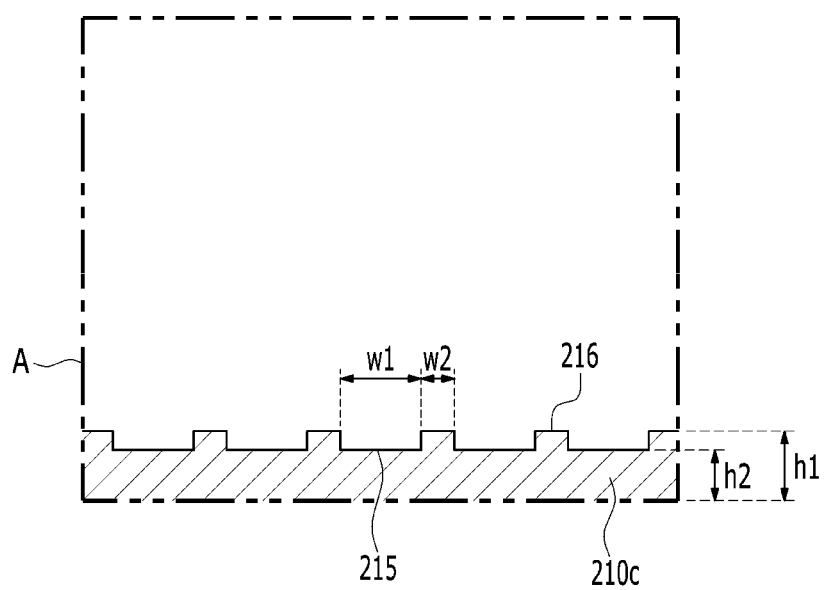
FIG. 7 is a cross-sectional view taken along a cutting line a-a' of FIG. 6.
Figure 8:
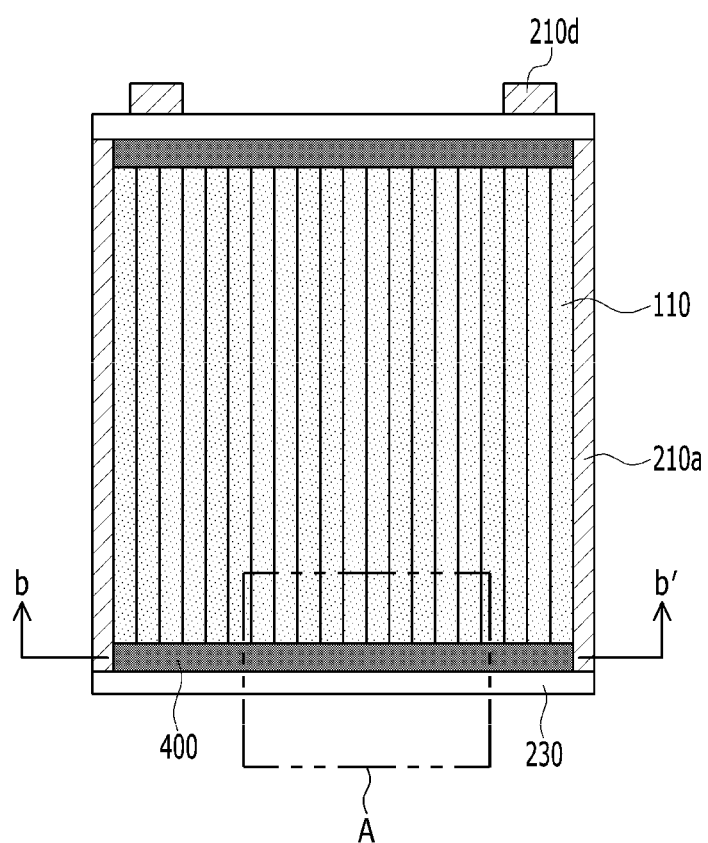
FIG. 8 is a cross-sectional view taken along an xy plane of FIG. 2.
Figure 9:
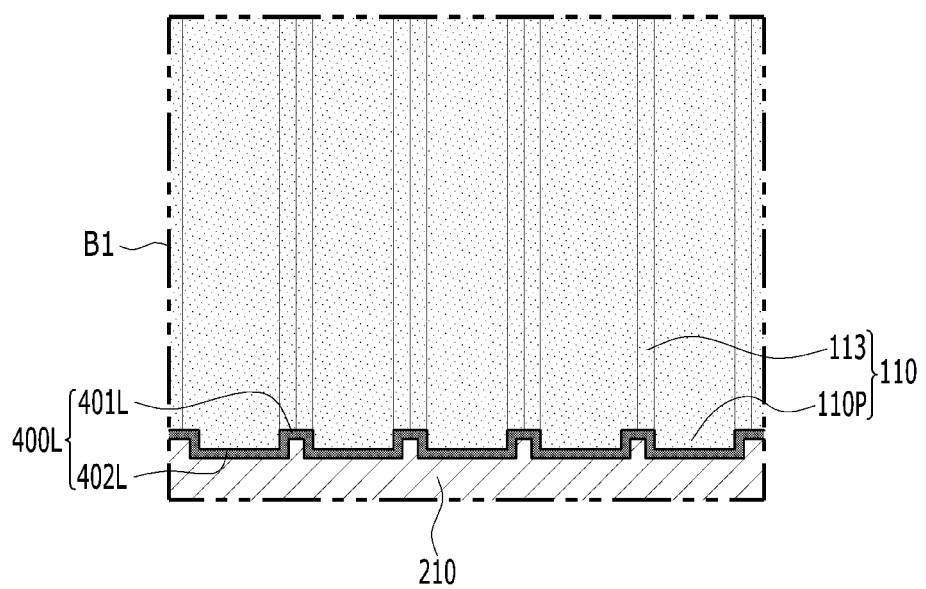
FIG. 9 is a cross-sectional view taken along a cutting line b-b' for a region A of FIG. 8.

FIG. 7 is a cross-sectional view taken along a cutting line a-a' of FIG. 6. FIG. 8 is a cross-sectional view taken along an xy plane of FIG. 2. FIG. 9 is a cross-sectional view taken along a cutting line b-b' for a region A of FIG. 8.

Referring to FIG. 1, FIG. 2, and FIG. 6, the lower frame 210 includes a side surface part 210a covering the side of the battery cell stacked member 120, a bottom part 210b covering the lower surface of the battery cell stacked member 120, a first side part 210c covering the supporting unit 400L of the bus bar frame 400 positioned at the front of the battery cell stacked member 120, and a second side part 210d covering a supporting part (not shown) of the bus bar frame 400 positioned at the rear of the battery cell stacked member 120. Particularly, the lower surface of the lower frame 210 includes the bottom part 210b, the first side part 210c, and the second side part 210d, but at least one of the first side part 210c and the second side part 210d may be formed thinner than the thickness of the bottom part 210b.

Here, the first side part 210c and the second side part 210d may have different shapes. For example, referring to FIG. 1 and FIG. 5, as the heat sink 300 is formed on the lower surface of the lower frame 210, a cooling port (not shown) for allowing the refrigerant inside the heat sink 300 to flow out of the heat sink may be formed on the second side part 210d. Accordingly, the second side part 210d may have a protruded part having both ends extending along the length direction (the y-axis direction) of the battery module 100 so that the cooling port (not shown) may be formed in the battery module 100. In this case, in consideration of the fact that the cooling port (not shown) is formed in the second side part 210d, a step may be formed in a portion where the second side part 210d contacts the bottom part 210b. The step formed in the second side part 210d may be formed long along the x-axis direction. Accordingly, the second side part 210d may be easily combined with the cooling port, and the processing process may also be simplified.

Referring to FIG. 1, FIG. 6, and FIG. 7, in the first side part 210c, at least two step regions 215 are formed and a protruded region 216 is formed between two step regions 215. The step region 215 and the protruded region 216 may be alternately arranged in the same direction as the direction in which the battery cells are stacked.

Referring to FIG. 7, FIG. 8, and FIG. 9, the step region 215 and the protruded region 216 may be formed in a shape corresponding to the supporting unit 400L of the bus bar frame 400. Particularly, the step region 215 may be formed of the shape corresponding to the step part 402L of the supporting unit 400L, and the protruded region 216 may be formed of a shape corresponding to the supporting parts 401L of the supporting unit 400L. Accordingly, the step region 215 may be formed concavely corresponding to the step part 402L of the supporting unit 400L.

Also, the width w1 of the step region 215 may have the length corresponding to the width of the protruded part 110p of the battery cell 110 and/or the width of the step part 402L of the supporting unit 400L. In addition, the width w2 of the protruded region 216 may correspond to a width of the supporting part 401L of the supporting unit 400L. Specifically, the width w2 of the protruded region 216 may correspond to the difference between the thickness of the battery body 113 of the battery cell 110 and the thickness of the protruded part 110p.

In addition, the height h2 of the step region 215 may have a length corresponding to a length excluding the length of the protruded part 110p of the battery cell 110 from the height h1 of the first side part 210c. In addition, the height h2 of the step region 215 may have a length corresponding to the length excluding the length of the supporting part 401L of the supporting unit 400L from the height h1 of the first side part 210c. In this case, the height of the first side part 210c may be the same as the height of the center part 210b, or even if it is less than the height of the bottom part 210b, it may be greater than the height h2 of the step region 215.

Accordingly, the supporting unit 400L of the bus bar frame 400 wraps the protruded part 110P of the battery cell 110 and the lower part of the battery body 113, so that the protection and the insulation performance of the protruded part 110p of the battery cell 110 can be secured. In addition, the lower frame 210 may additionally secure the thermally conductive resin or a space in which or the bottom part 210b may be positioned in the first side part 210c, thereby increasing the rigidity of the lower frame 210.

Figure 10:
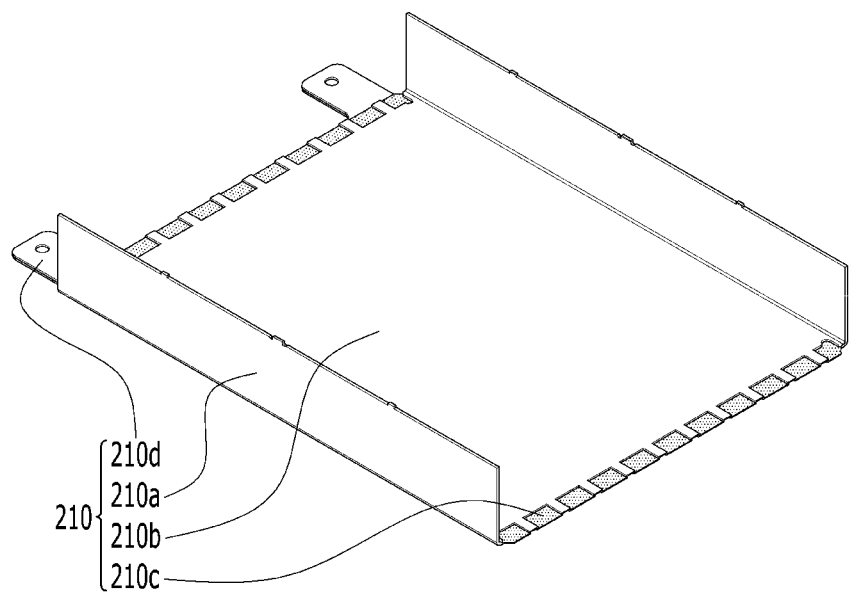
FIG. 10 is a perspective view showing a lower frame according to another embodiment of the present invention.

FIG. 10 is a perspective view showing a lower frame according to another embodiment of the present invention. Regarding the embodiment FIG. 10, the same contents as the above-described contents among the configurations of the battery module 100 are omitted, and the second side part 210d of the lower frame 210 is mainly described.

Referring to FIG. 1 and FIG. 10, the second side part 210d of the lower frame 210 may be configured in the same shape as the first side part 210c. In addition, the supporting part of the bus bar frame 400 positioned at the rear of the battery cell stacked member 110 (not shown) may also be formed in the same shape as the supporting unit 400L of the bus bar frame 400 positioned at the front of the battery cell stacked member 110. Accordingly, in the lower frame 210, the thermally conductive resin secured through the first side part 210c and the second side part 210d or the space in which the bottom part 210b may be positioned may be expanded, so that the rigidity of the lower frame 210 may be higher.

Hereinafter, the bus bar frame 400 and the lower frame 210 included in the battery module 100 according to an embodiment of the present invention are described in detail compared with a comparative example.

Figure 11:
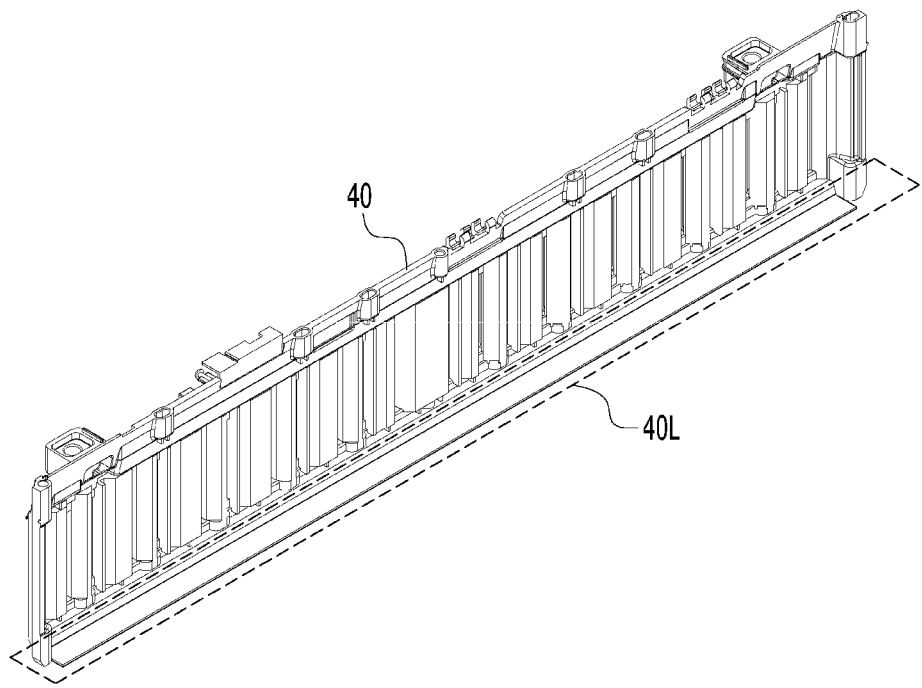
FIG. 11 is a view showing a bus bar frame in a battery module according to a comparative example.
Figure 12:
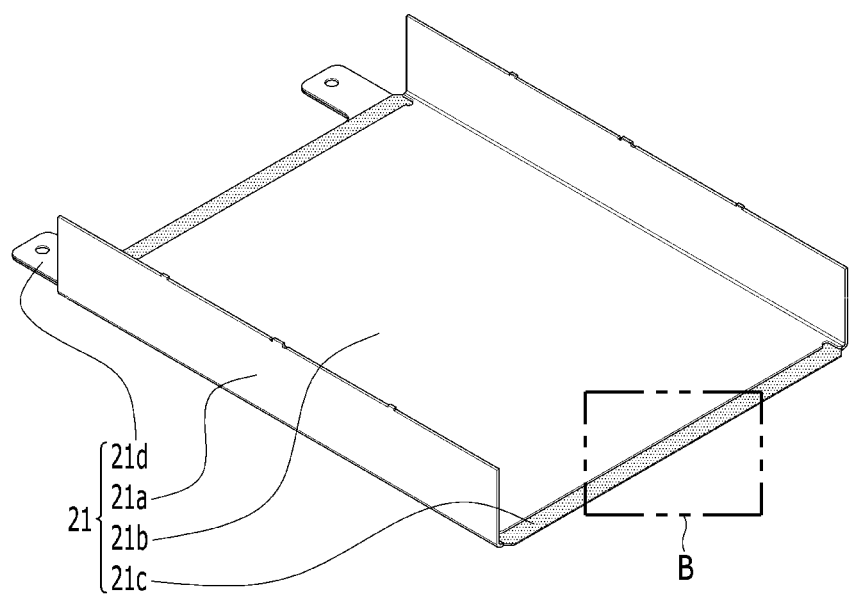
FIG. 12 is a view showing a lower frame in a battery module according to a comparative example.
Figure 13:
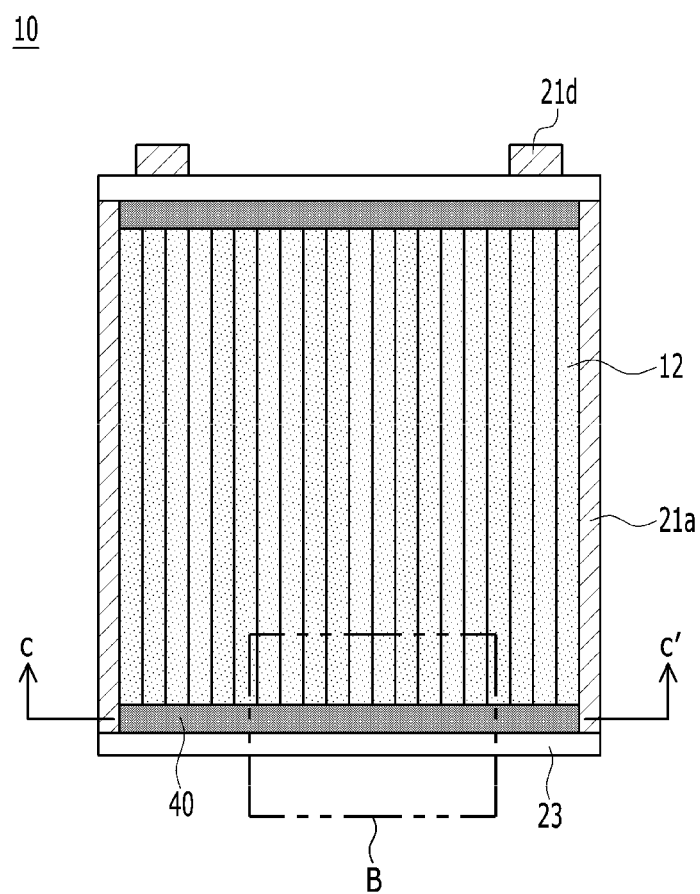
FIG. 13 is a cross-sectional view taken along an xy plane of a battery module according to a comparative example.
Figure 14:
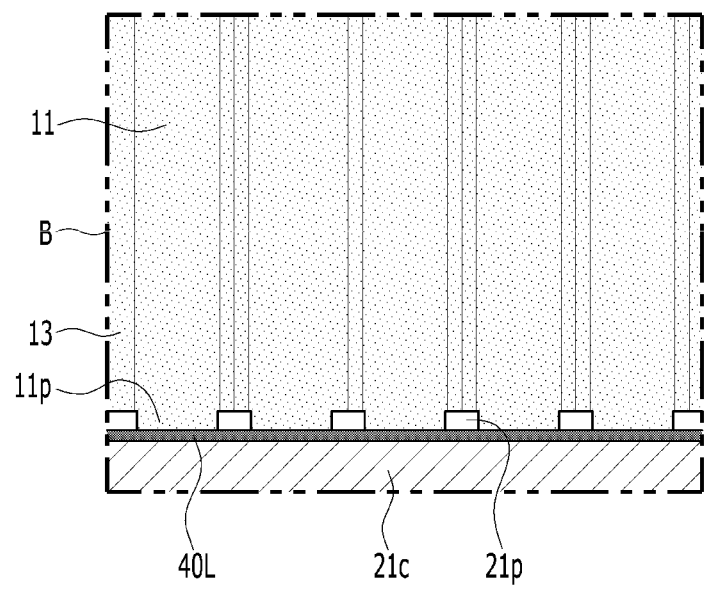
FIG. 14 is a cross-sectional view taken along a cutting line c-c' for a region B of FIG. 13.

FIG. 11 is a view showing a bus bar frame in a battery module according to a comparative example. FIG. 12 is a view showing a lower frame in a battery module according to a comparative example. FIG. 13 is a cross-sectional view taken along an xy plane of a battery module according to a comparative example. FIG. 14 is a cross-sectional view taken along a cutting line c-c' for a region B of FIG. 13.

Referring to FIG. 11 to FIG. 14, a battery module 10 according to a comparative example includes a battery cell stacked member 12 in which a plurality of battery cells 11 are stacked in one direction, a lower frame 21 accommodating the battery cell stacked member 12, an upper plate (not shown) covering the upper surface of the battery cell stacked member, an end plate 23 covering the front and rear surfaces of the battery cell stacked member, and a bus bar frame 40 formed between the end plate 23 and the front and rear surfaces of the battery cell stacked member 12.

Referring to FIG. 11, in the bus bar frame 40 according to the comparative example, a supporting part 40L to protect the protruded part 11P of the battery cell 11 is formed, and the supporting part 40L extends in the length direction of the bus bar frame 40 with a straight line shape. Referring to FIG. 12, in the lower frame 21 according to the comparative example, the lower surface includes a center part 21b, a first side part 21c, and a second side part 21d, and the first side part 21c and the second side part 21d are formed more thinly than the thickness of the bottom part 21b, thereby forming the step region.

However, when comparing FIG. 9 and FIG. 14, the battery module 10 according to the comparative example has an empty space 21p positioned between two protruded parts 11p. The empty space 21p is formed as the lower part of the battery body 13 and the supporting part 40L are separated by the length of the protruded part 11p. That is, in the battery module 10 according to the comparative example, the supporting part 40L contacts only the lower surface of the protruded part 11p, and thus the protection of the protruded part 11p by the supporting part 40L is insufficiently performed. In addition, the lower frame 21 cannot be extended to the empty space 21p due to the supporting part 40L, so the entire area of the first side part 21c and the second side part 21d is formed thinner than the thickness of the bottom part 21b, thereby lowering the rigidity of the lower frame 21. Therefore, the battery module 10 according to the comparative example includes the lower frame with low rigidity, and it is difficult for the battery module 10 to form a large area module.

In contrast, the battery module according to the embodiment described in FIG. 1 to FIG. 10, as described above, has an effect of increasing the rigidity of the lower frame 210 while securing the protection and insulation performance of the protruded part 110p of the battery cell 110.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF REFERENCE NUMERALS

110: battery cell
120: battery cell stacked member
210: module frame
400: bus bar frame

The invention claimed is:

1. A battery module comprising:
a battery cell stacked member in which a plurality of battery cells are stacked in a first direction;
a bus bar frame connected to at least one of a front surface and a rear surface of the battery cell stacked member; and
a frame member accommodating the battery cell stacked member to which the bus bar frame is mounted,
wherein a first side of a bottom part of the frame member includes a plurality of upwardly facing step regions,
wherein the plurality of step regions are spaced apart in the first direction,
wherein a bottom surface of the bus bar frame includes a downwardly facing support having a shape corresponding to the plurality of step regions,
wherein the support of the bus bar frame is positioned between the plurality of battery cells and the plurality of step regions,
wherein a protruded part extending toward the plurality of step regions is formed at an end of the plurality of battery cells, and
wherein the support of the bus bar frame has a shape surrounding at least one region of the protruded part.

2. The battery module of claim 1, wherein the support extends from the bus bar frame in a direction vertical to the first direction,
wherein the support includes a plurality of step parts corresponding to the plurality of step regions, and
wherein the plurality of step parts are formed to be spaced apart along the first direction.

3. The battery module of claim 1, wherein the support includes a first surface in contact with a side of the protruded part and a second surface in contact with a lower surface of the protruded part.

4. The battery module of claim 3, wherein each step region of the plurality of step regions is concavely formed to correspond to the first surface and the second surface.

5. The battery module of claim 1, wherein the support includes:
a plurality of step parts respectively mounted to the plurality of step regions; and
a plurality of supporting parts disposed between the plurality of step parts adjacent to each other, and
wherein the plurality of supporting parts and the plurality of step parts are formed with a wave shape.

6. The battery module of claim 1, wherein a thickness of each battery cell of the plurality of battery cells is larger than a thickness of the protruded part.

7. The battery module of claim 6, wherein the plurality of step regions includes a first step region and a second step region, and
wherein a distance between the first step region and the second step region corresponds to a difference of the thickness of the battery cell and the thickness of the protruded part.

8. The battery module of claim 1, wherein the bottom part of the frame member includes a first portion and a second portion,
wherein the plurality of step regions corresponds to the first portion, and
wherein a thickness of the first portion is less than a thickness of the second portion.

9. The battery module of claim 1, wherein the frame member includes a lower frame covering a lower part and opposite sides of the battery cell stacked member and an upper plate covering an upper surface of the battery cell stacked member.

10. The battery module of claim 9, wherein one step part extending in the first direction is formed at a second side of the bottom part of the frame member.

11. The battery module of claim 10, wherein a protruded part to which a cooling port is combined is respectively formed at both ends of the second side of the bottom part of the frame member.

12. A battery pack including a battery module of claim 1.

13. The battery module of claim 1, wherein a second side of a bottom part of the frame member includes a plurality of step regions.

14. The battery module of claim 13, wherein the plurality of step regions at the first side of a bottom part of the frame member is spaced from the plurality of step regions at the second side of a bottom part of the frame member.

* * * * *